Aug. 12, 1924.
R. KROEDEL
1,504,485

CAMERA BACK

Filed Sept. 8, 1922
2 Sheets-Sheet 1

INVENTOR.
Robert Kroedel
BY
his ATTORNEY

Aug. 12, 1924. 1,504,485
R. KROEDEL
CAMERA BACK
Filed Sept. 8, 1922 2 Sheets-Sheet 2
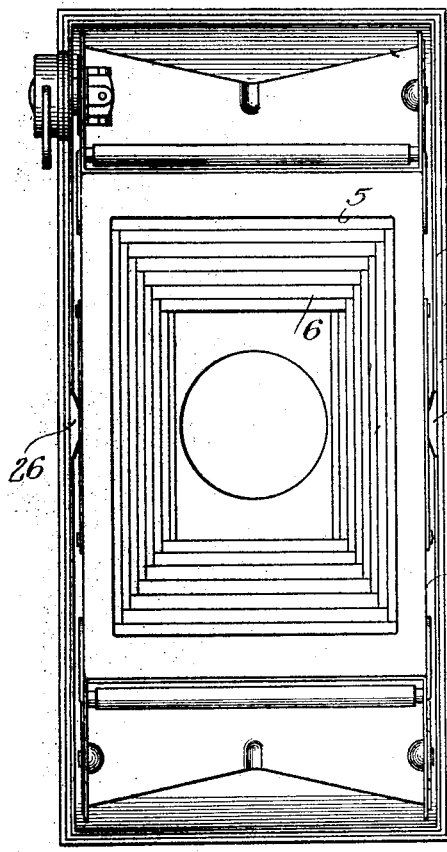
Fig.5
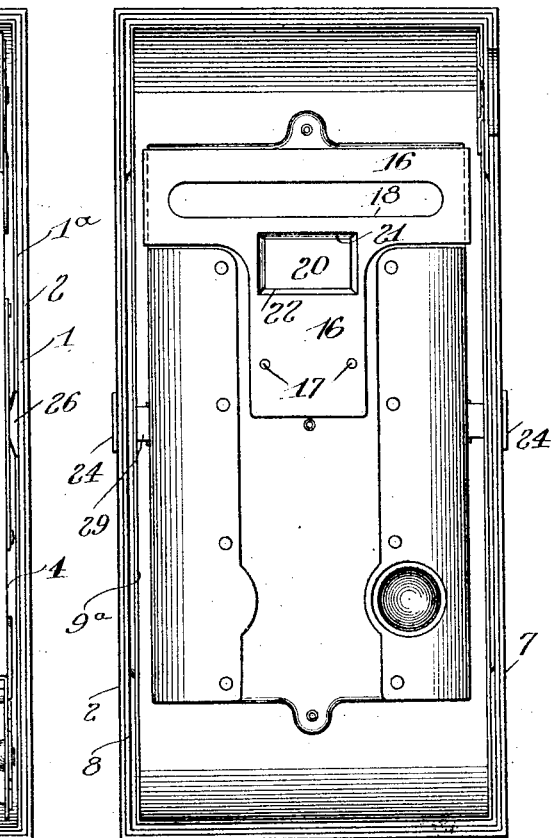
Fig.6
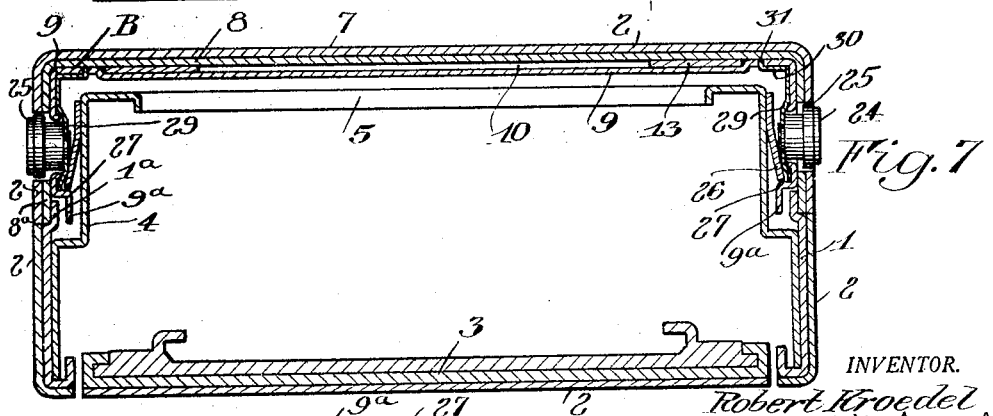
Fig.7
Fig.8
INVENTOR.
Robert Kroedel
BY
his ATTORNEY Patented Aug. 12, 1924.

1,504,485

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

CAMERA BACK.

Application filed September 8, 1922. Serial No. 586,993.

*To all whom it may concern:*

Be it known that I, ROBERT KROEDEL, a citizen of the United States, and residing at Rochester, in the county of Monroe and State of New York, have invented certain new and useful Improvements in Camera Backs; and I do hereby declare the following to be a full, clear, and exact description of the same, reference being had to the accompanying drawings, forming a part of this specification, and to the reference numerals marked thereon.

My present invention relates to photography and, more particularly, to photographic cameras being especially applicable to folding pocket cameras of the familiar type, and it has for its object to provide a simple, neat and efficient construction of the camera back particularly with respect to the characteristics adapting it to form a light sealing connection with the camera body. The improvements are further directed toward combining these features of construction with other structural features such as the application of a sliding door for inscribing characters on the exposed sensitive material. To these and other ends the invention consists in certain improvements and combinations of parts, all as will be hereinafter more fully described, the novel features being pointed out in the claims at the end of the specification.

In the drawings:

Figure 5 is a rear view of the camera body with the back removed;

Figure 6 is a front view of the back removed from the body;

Figure 7 is an enlarged transverse section on the line 7—7 of Figure 1, and

Figure 8 is an enlarged fragmentary view partly in section through the back showing an interior view of one of the back catches.

Similar reference numerals throughout the several views indicate the same parts.

Figure 1:
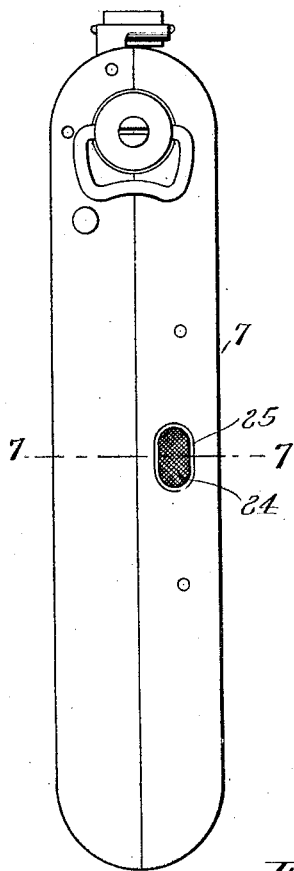
Figure 1 is a side view of a folding pocket camera constructed in accordance with and illustrating one embodiment of my invention.

I have shown in the drawings only so much of the camera proper or camera body as is necessary to an understanding of the manner in which the back cooperates therewith. So far as shown it comprises a metal shell 1 having the usual leather cover 2 enclosed at the front by a hinged door 3 which when extended constitutes the bed as usual. Suitably secured to the inner sides of the shell wall is a metallic frame 4 that is extended to the rear where it is provided with an opening 5 constituting the exposure opening of the camera and also the frame to which the rear end of the usual bellows 6 is secured, the bellows being normally stored within the chamber provided between the closed door 3 and the said exposure opening 5. As is usual with folding pocket cameras the general form of the body is flat with rounded ends as is that of the back 7 hereinafter more fully described, the back and body meeting along a medium line as indicated in Figure 1.

Figure 2:
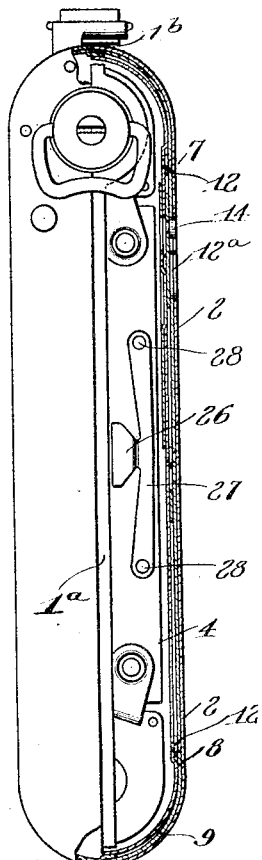
Figure 2 is a similar view but showing the back in vertical section.
Figure 3:
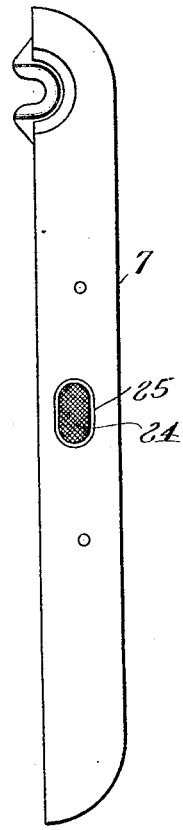
Figure 3 is a side view of the back removed.

The back 7 is also preferably formed of a metallic shell 8 having the same leather covering 2 and within which is nested a similar shell 9, the two shells being provided with rounded ends adapted to meet the similar rounded ends of the body portion above referred to. As shown best in Figures 2 and 7 the body shell 1 is extended at the rear and sides in an offset $1^a$ lying beyond the trimmed edge of the leather covering 2 to form the single blade of a telescoping light shield. Cooperating therewith is the double blade of the other element of the light shield on the camera back, and this is formed by a portion $8^a$ of the outer shell 8 of the back that abuts the shoulder of the offset $1^a$ and by an offset flange $9^a$ on the inner shell 9 of the back. The blade or flange $1^a$ thus receives the blades or flanges $8^a$ and $9^a$ on opposite sides thereof as the back is applied to the camera body and the entrance of light at this point is effectually prevented though the parts are easily fitted together and detached.

Figure 4:
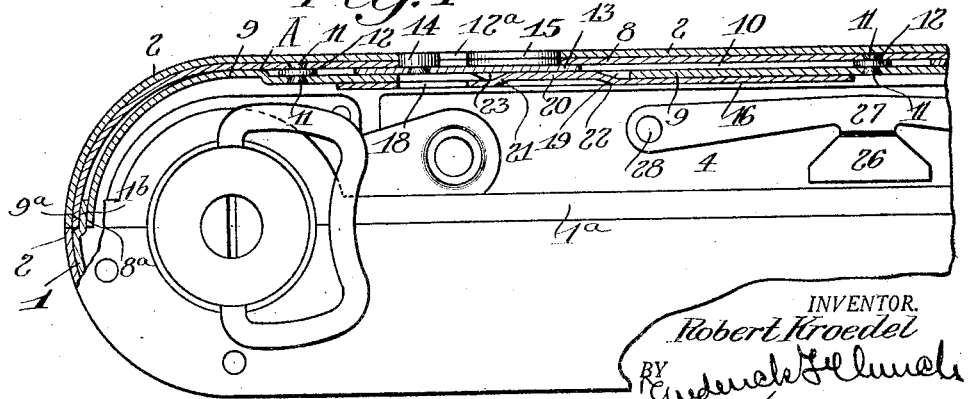
Figure 4 is a fragmentary enlargement of the upper portion of Figure 2.

At the ends of the camera where the back and body are rounded to meet in a semi-cylindrical curve much the same formation is used for the light lock, the body flange or blade as best shown in Figure 4, being offset at $1^b$ in exactly the same manner and the back shells 8 and 9 engaging on opposite sides thereof at $8^a$ and $9^a$ respectively except that these latter parts do not consist of offset portions, the required space between them being produced by striking their respective curvatures upon different radii, the radius of the inner one being less than that of the outer one, as shown whereby they gradually diverge to a spaced relationship at the forward edge, although in contact in the region of the plane wall of the back.

The points at which the two nested shells 8 and 9 of the back are actually in contact are shown at A in Figure 4 and at B in Figure 7, that is at the top and bottom of the camera in one place and at the sides in the other. Between these points in the rear wall of the back the inner shell 9 is embossed or offset from the outer shell 8 to leave a central space 10 between them and this space is created and the two shells at the same time secured rigidly together by a peculiar form of rivet best shown in Figure 4. These rivets as indicated at 11 are double ended, one end being upset in each plate, and are provided with shoulder portions 12 in the form of intermediate enlargements that lie between the plates and properly space them. The rivets are of course concealed from the exterior by the leather covering 2.

The rear wall of the back is provided with the usual transverse slot or opening 12ª opposite the frame of the exposure opening 5 for the purpose of inscribing, by light printing desired characters on the margin of each picture area. This opening is normally closed by a sliding door 13 operated by a button 14 that takes into an extension 15 of the opening 12 when the door is opened, the door being shown in closed position in Figure 4. An advantage of my back construction is that I can utilize the space 10 provided between the back shells 8 and 9 for the mounting of this door 13 which slides between them as shown. A spring plate 16 (Figures 4 and 6) is secured to the inside of the back by rivets 17; is provided with an opening 18 registering with the inscription opening 12 and itself overlies the somewhat larger opening 19 in the inner shell 9 of the back. An embossed or cam portion 20 on this spring plate having inclines 21 and 22 at its margins is offset into this opening 19 so that as the door 13 is slid back and forth between its open and closed positions a knob 23 thereon will ride the said cam portion 20 and yieldingy lock against either the incline 21 or the incline 22 to hold the door in its said position. This spring plate 16 is also thereby pressed outwardly or forwardly against the film to hold it securely while being written on as usual.

Any desired means in the way of catches or locks may be employed for holding the back and body together. In the present instance I have shown an improved back catch best illustrated in Figures 2, 7 and 8 and comprising push buttons 24 for releasing it, said push buttons projecting through suitable openings 25 in the side walls of the back to be accessible to the fingers at convenient points. The catches themselves consist of inclined spring fingers 26 extended from plate 27 riveted at 28 to the inner frame 4 of the camera body and so disposed as to automatically engage and lock with the shoulders 27 formed by offsetting the above described light seal blades 9ª of the inner back shell 9. The buttons 24 are also mounted on yielding spring plates 29 riveted at 30 to the side flanges of the shell 9 and having extensions 30 provided with fingers or spurs 31 that are anchored in small recesses provided for the purpose in the inner back shell 9. When the back and body are together these buttons 24 are held in outward positions by their spring plates 29 on which they are carried but are opposite to the spring catches 26 which, however, are free to snap in behind the shoulders 27 of the back as the latter is pressed into place on the body. Upon depressing the buttons 24, however, the spring catches 26 are so depressed or flattened as to clear the shoulders 27 allowing the latter and the back to be withdrawn away from the body.

I claim as my invention:

1. The combination with a camera body having flanges on its rear side constituting one element of a light seal, of a back for the body embodying two nested plates secured together but spaced apart at their edges to receive the flanges in the body between them and to constitute the other element of the light seal.

2. The combination with a camera body having flanges on its rear side constituting one element of a light seal, of a back for the body having rounded forwardly curved ends and embodying two nested plates secured together but spaced apart at their ends by reason of the inner one being curved on a substantially shorter radius than the other one so that they receive the flanges on the body between them and to constitute the other element of the light seal.

3. The combination with a camera body, of a back having a light-tight connection therewith and embodying a pair of nested plates constituting one element of a light seal, the body being provided with the cooperating element and double ended shouldered rivets connecting the two plates of the back, the shoulders providing an intermediate enlarged portion on the rivets lying between the plates to space the same.

4. The combination with a camera body, of a back having an opening therein through which film within the camera may be inscribed and having a light-tight connection with the body, said back embodying a pair of nested plates constituting one element of a light seal, the body being provided with the co-operating element, double-ended shouldered rivets connecting the two plates of the back, the shoulders providing an intermediate enlarged portion on the rivets lying between the plates to space the same, and a sliding door for the opening in the back, said door being confined and operating in the space between the plates of the latter.

5. The combination with a camera body, of a back having a light tight connection therewith and embodying a pair of nested spaced plates secured together and having registering openings therein through which films within the camera may be inscribed, and a sliding door for the openings confined and operating in the space between the plates.

6. The combination with a camera body, of a back having an opening therein through which film within the camera may be inscribed and having a light-tight connection with the body, said back embodying a pair of nested plates constituting one element of a light seal, the body being provided with the co-operating element adapted to be received between the edges of the plates, means connecting the plates in spaced relationship, and a sliding door for the opening in the back, said door being confined and operating in the space between the plates of the latter.

ROBERT KROEDEL.